United States Patent
Reusch et al.

(10) Patent No.: US 7,434,538 B2
(45) Date of Patent: Oct. 14, 2008

(54) WATER AGITATION SYSTEM FOR WATER RETENTION STRUCTURE

(75) Inventors: Thomas K. Reusch, Elburn, IL (US); Donald B. Owen, Batavia, IL (US); Joe Blahnik, St. Charles, IL (US)

(73) Assignee: Allied Precision Industries, Inc., Elburn, IL (US)

( * ) Notice: Subject to any disclaimer, the term of this patent is extended or adjusted under 35 U.S.C. 154(b) by 556 days.

(21) Appl. No.: 10/643,055

(22) Filed: Aug. 18, 2003

(65) Prior Publication Data

US 2004/0216685 A1 Nov. 4, 2004

Related U.S. Application Data

(60) Provisional application No. 60/461,964, filed on Apr. 10, 2003.

(51) Int. Cl.
*A01K 45/00* (2006.01)

(52) U.S. Cl. ...................... 119/69.5; 119/255

(58) Field of Classification Search .............. 119/72, 119/69.5, 73, 255, 263; 416/85, 86; 366/342, 366/343, 241; 210/242.2
See application file for complete search history.

(56) References Cited

U.S. PATENT DOCUMENTS

| | | | | |
|---|---|---|---|---|
| 2,272,582 A | * | 2/1942 | Poppe | 446/166 |
| 2,877,051 A | * | 3/1959 | Cushman et al. | 239/17 |
| 3,836,130 A | * | 9/1974 | Earhart et al. | 261/142 |
| 4,086,306 A | * | 4/1978 | Yoshinaga | 261/93 |
| 4,166,086 A | * | 8/1979 | Wright | 261/93 |
| 4,216,091 A | * | 8/1980 | Mineau | 210/175 |
| 4,448,685 A | * | 5/1984 | Malina | 210/219 |
| 4,681,711 A | * | 7/1987 | Eaton | 261/91 |
| 4,748,808 A | * | 6/1988 | Hill | 60/398 |
| 5,336,399 A | * | 8/1994 | Kajisono | 210/169 |
| 5,356,569 A | * | 10/1994 | Von Berg | 261/87 |
| 5,807,151 A | * | 9/1998 | Sumino | 440/80 |
| 5,980,100 A | * | 11/1999 | Haegeman | 366/262 |
| D457,595 S | * | 5/2002 | Ellsworth et al. | D23/200 |

FOREIGN PATENT DOCUMENTS

FR 2517564 A * 6/1983

\* cited by examiner

*Primary Examiner*—T. Nguyen
(74) *Attorney, Agent, or Firm*—McAndrews, Held & Malloy, Ltd.

(57) ABSTRACT

A water agitation system for use with a water retention structure, such as a bird bath or livestock water trough, includes a motor operatively connected to a drive shaft, and a blade assembly extending outwardly from the drive shaft. The motor is operable to rotate the blade assembly in order to impart motion to water retained within the water retention structure.

32 Claims, 13 Drawing Sheets

WATER AGITATION SYSTEM FOR WATER RETENTION STRUCTURE

RELATED APPLICATIONS

This application relates to and claims priority benefits from U.S. Provisional Patent Application No. 60/461,964 entitled "Water Agitator for Bird Baths," filed Apr. 10, 2003, which is incorporated by reference herein in its entirety.

BACKGROUND OF THE INVENTION

The present invention generally relates to water retention structures, such as bird bath basins, livestock water tanks/troughs, swimming pools, small ponds, fish tanks, and the like, and more specifically to a water agitator for placement in a water retention structure, to agitate or circulate water contained in the water retention structure.

Various water retention structures exist for a variety of purposes. For example, bird baths retain water for birds to bathe and frolic; swimming pools retain water for recreational purposes; backyard ponds retain water for aesthetic purposes (such as a habitat for small fish); livestock water tanks/troughs hold water for livestock to drink; water towers store water for various uses; and so on.

Bird baths are popular for attracting birds to residential homes, for example, and they may promote an interest in, and the well-being of, birds. An exemplary bird bath is described in U.S. Pat. No. 6,484,666, issued Nov. 26, 2002 to Thomas K Reusche, and assigned to Allied Precision Industries, Inc., which is hereby incorporated by reference in its entirety.

FIG. 1 illustrates an isometric view of a bird bath 100. The bird bath 100 includes a base 102 that supports a column 104, which in turn supports a basin 106. The basin 106 is configured to receive and retain water.

It is known to provide pumps for imparting motion to the water in the bird bath basin. Movement of the water tends to attract birds to the bath. It also reduces the potential for the bird bath to serve as a haven for insects, e.g., mosquitoes, bacteria, germs, and the like. Water movement, or circulation, within the bird bath is particularly important given the recent rise of West Nile virus within the United States. However, pumps typically require access to an electrical outlet and are therefore not suitable when an electrical outlet is not readily available. Additionally, existing birdbaths cannot be easily retrofitted with such pumps.

Stagnant water in water retention structures typically increases the rate of breeding of insects, bacteria, germs, and the like. Further, stagnant, stale water is typically undesirable for a host of additional reasons. For example, the taste, odor and physical appearance of stagnant, stale water may be objectionable.

Thus, a need exists for an apparatus for imparting motion to water retained within water retaining structures, such as bird baths and livestock water tanks/troughs.

BRIEF SUMMARY OF THE INVENTION

A water agitation system adapted to be positioned within a water retention structure configured to receive and retain water, includes a main body positioned within a water retention area of the water retention structure. The water retention structure may be a basin of a bird bath, a livestock water tank/trough, a swimming pool, water tower, or a pond. The main body includes a base removably secured to a cover, and an inner compartment defined between the base and cover. A seal member may be interposed between the cover and the base. The system also includes at least one support member that supports the main body above a bottom surface of the water retention structure. The support members include a plurality of legs that extend downwardly from the main body. Optionally, the system may include a flotation member configured to allow the system to float on water within the water retention structure.

An agitator is operatively connected to a motor that is positioned within the inner compartment of the main body. The agitator is connected to a distal end of a drive shaft that extends outwardly from the main body. At least one blade extends from a lateral surface of the drive shaft that is rotatably driven by the motor in order to impart motion to water retained within the water retention structure.

Figure 1:
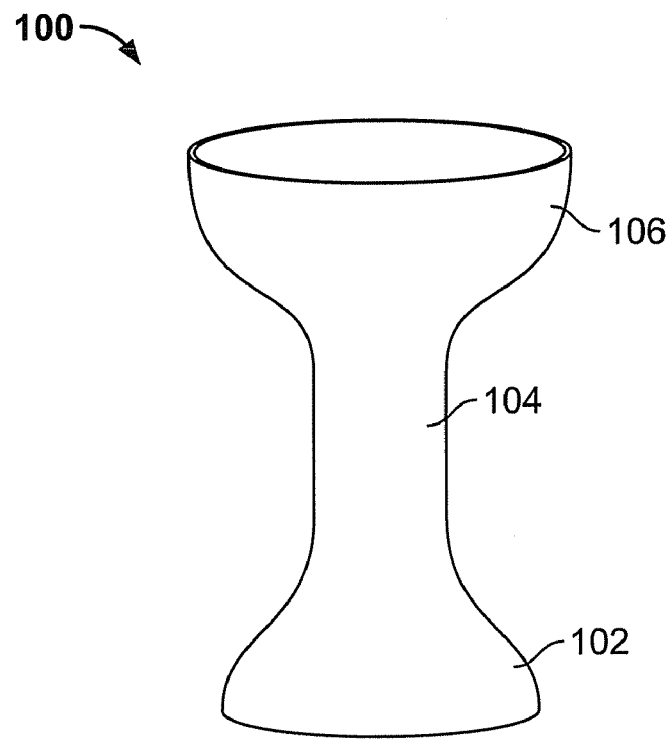
FIG. 1 illustrates an isometric view of a bird bath.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DETAILED DESCRIPTION OF THE INVENTION

FIGS. 2-9 illustrate a water agitation system 10 according to an embodiment of the present invention. The water agitation system 10 may be sized and constructed for placement in the basin of a bird bath, such as the bird bath 100 shown in FIG. 1, for imparting motion to water contained in the basin. Optionally, the water agitation system 10 may be sized and constructed for use with livestock water tanks/troughs, small ponds, swimming pools, water towers, and various other water retaining structures.

Figure 10:
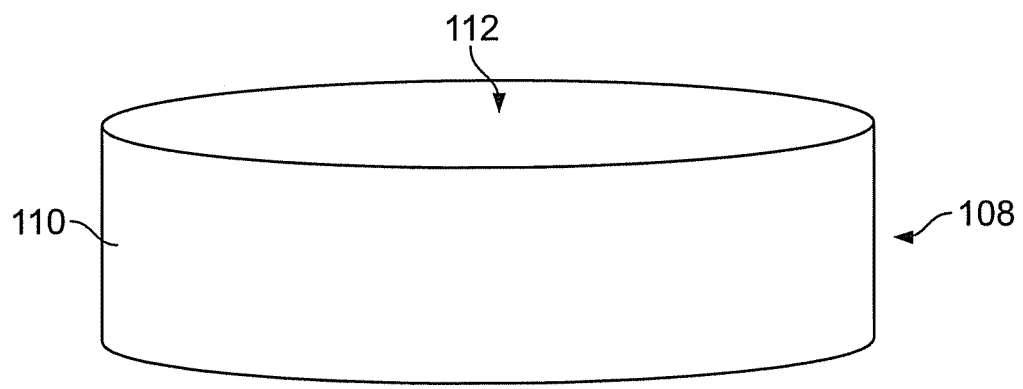
FIG. 10 illustrates a water retention structure.

FIG. 10 illustrates a water retention structure 108, in general. The water retention structure 108 includes a main body 110 defined by outer walls, which in turn define an interior cavity 112. The interior cavity 112 is configured to receive and retain water. The water retention structure 108 may also include a series of pumps, pipes, and the like (not shown) in order to allow the passage of water into and out of the interior cavity 112. The water retention system 108 may be formed in various shapes and sizes and may have an open top (such as a basin of a bird bath), or may be completely enclosed (such as a water tower). For example, the water retention structure 108 may be a basin of a bird bath such as the bird bath 100 shown in FIG. 1, a swimming pool, a livestock water trough, a backyard pond, etc.

Figure 2:
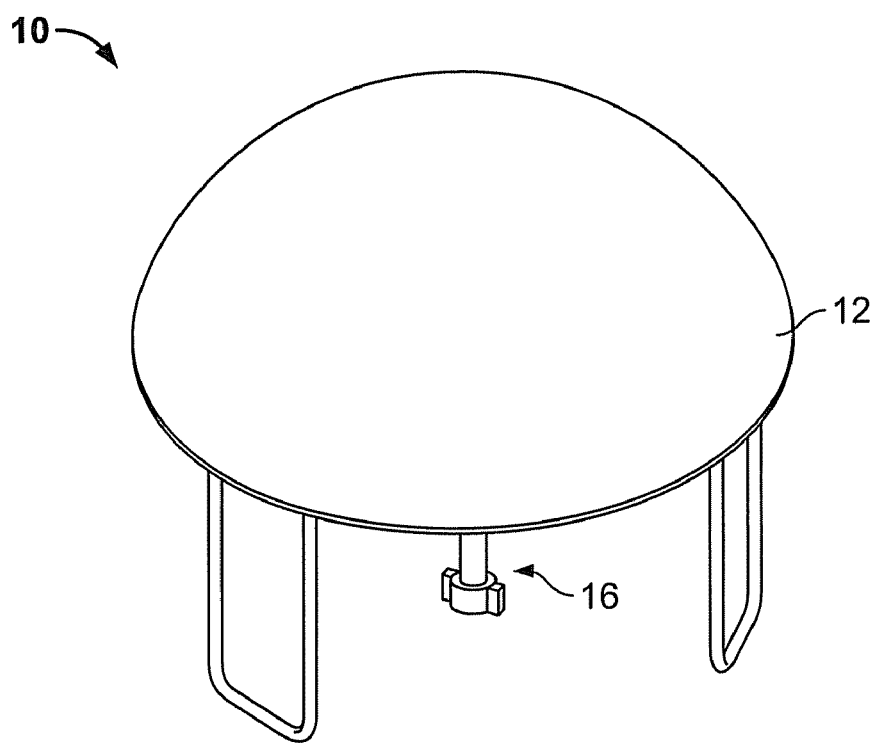
FIG. 2 illustrates an isometric view of a water agitation system according to an embodiment of the present invention.

FIG. 2 illustrates an isometric view of a water agitation system 10 according to an embodiment of the present invention. The water agitator generally comprises a housing 12, a motor 14 (shown in FIG. 5A) positioned within the housing 12, and an agitating mechanism, or agitator, 16 driven by the motor 14 so as to impart motion to water contained within a water retention structure, such as a basin of a bird bath.

Figure 3:
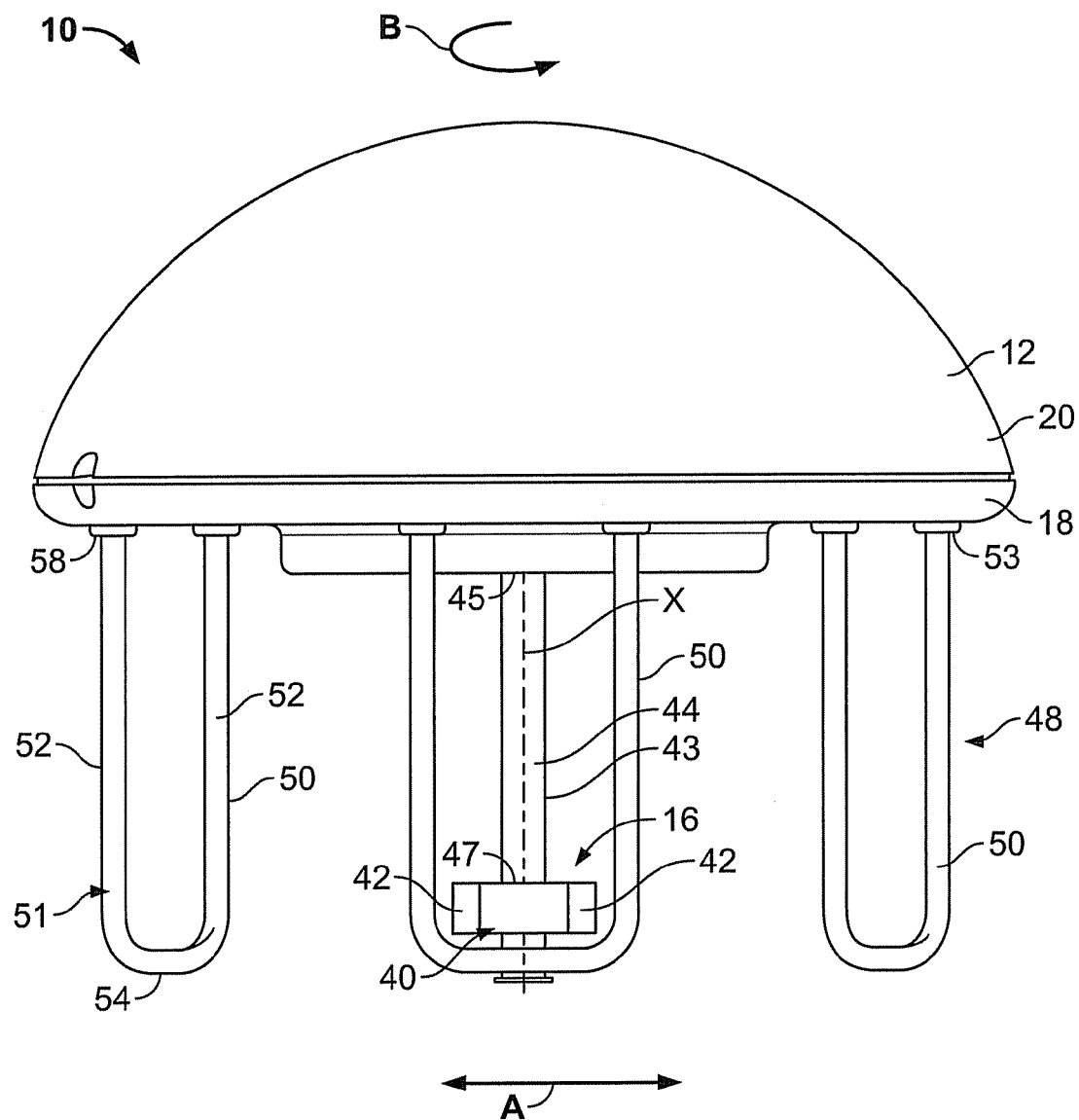
FIG. 3 illustrates a front elevation view of a water agitation system according to an embodiment of the present invention.

FIG. 3 illustrates a front elevation view of the water agitation system 10 of FIG. 2. The housing 12 includes a base 18 and a cover 20 that define an inner compartment 22 (shown, e.g., in FIG. 5A).

Figure 5A:
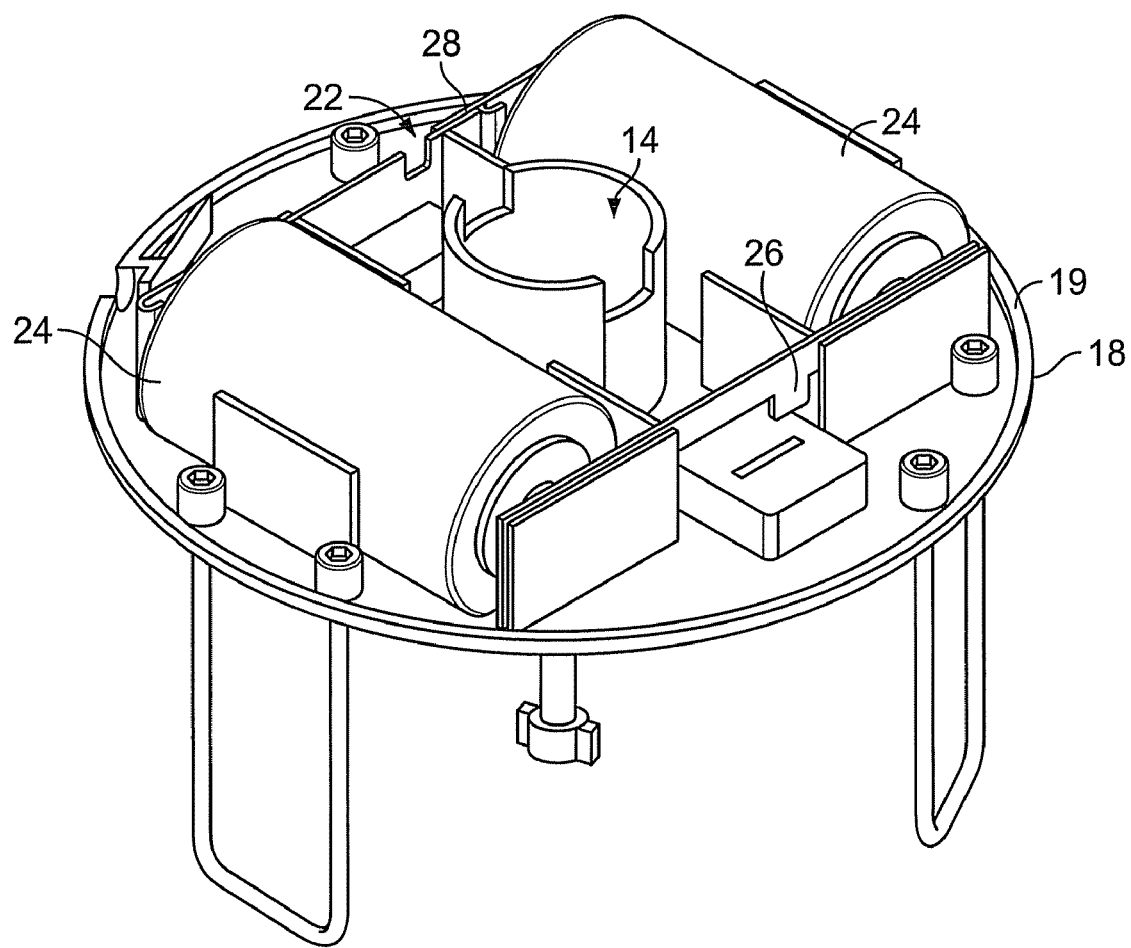
FIGS. 5A and 5B illustrate isometric views of a water agitation system according to an embodiment of the present invention.
Figure 5B:
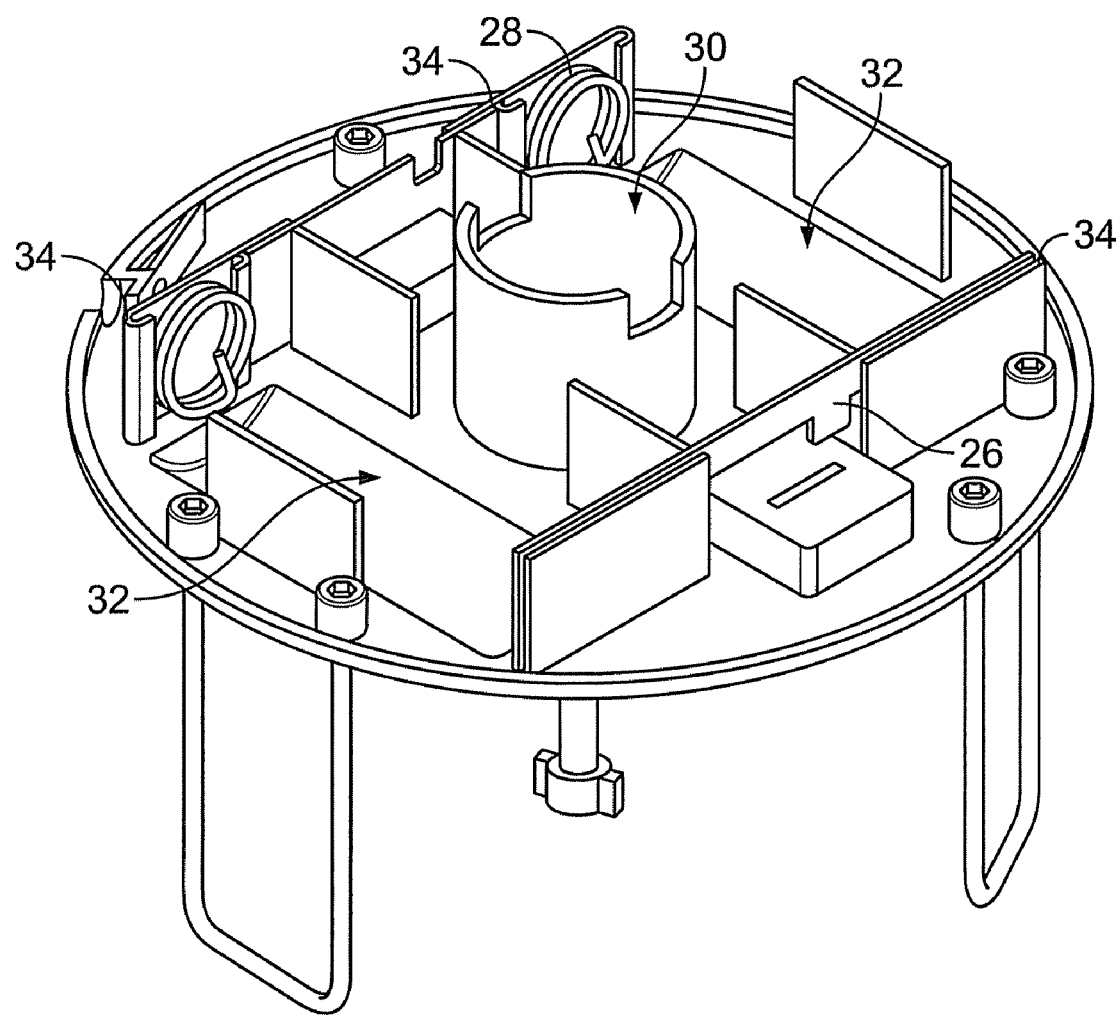
Figure 6A:
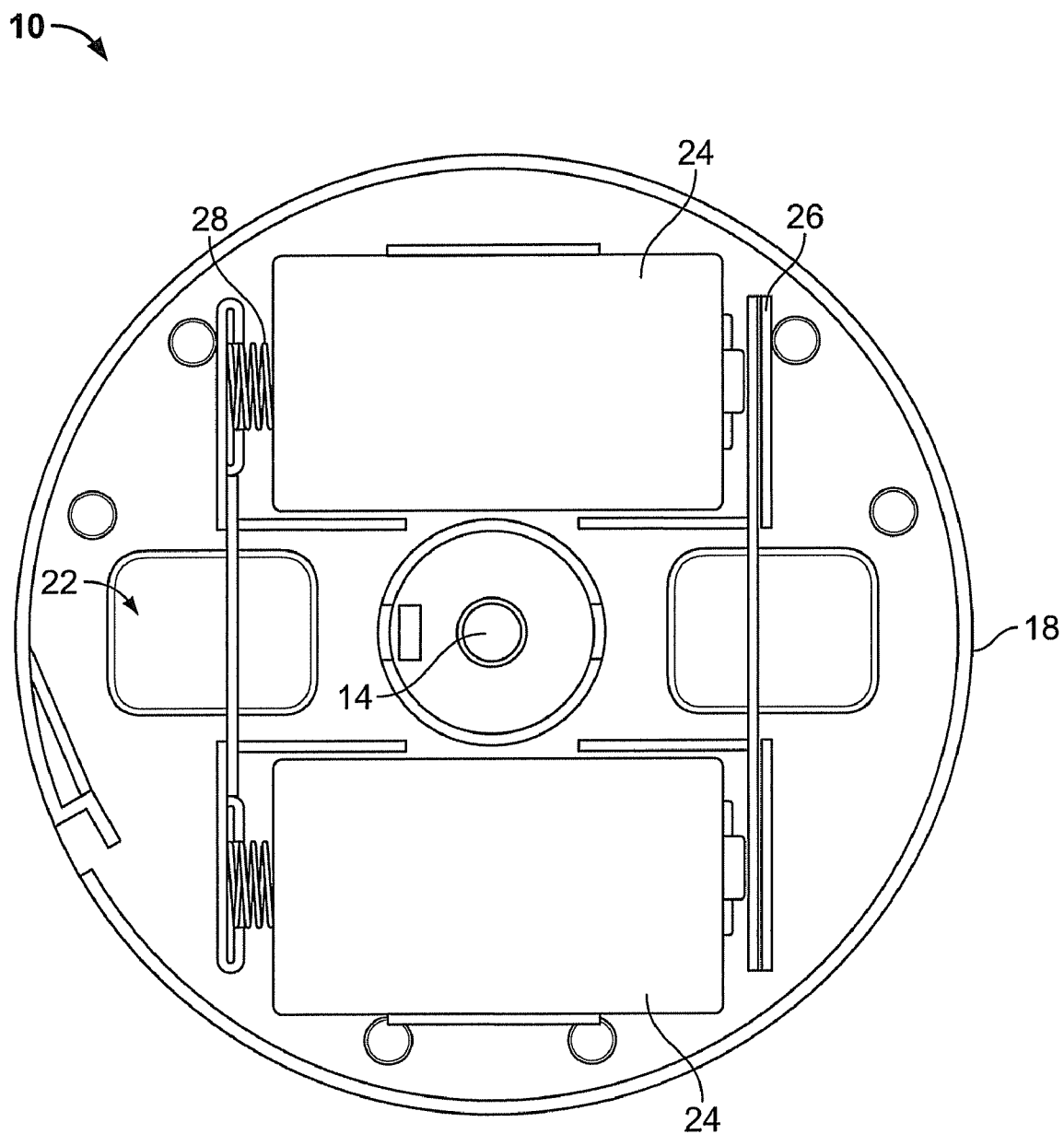
FIGS. 6A and 6B illustrate a top elevation view of the water agitation system of FIGS. 5A and 5B, respectively.
Figure 6B:
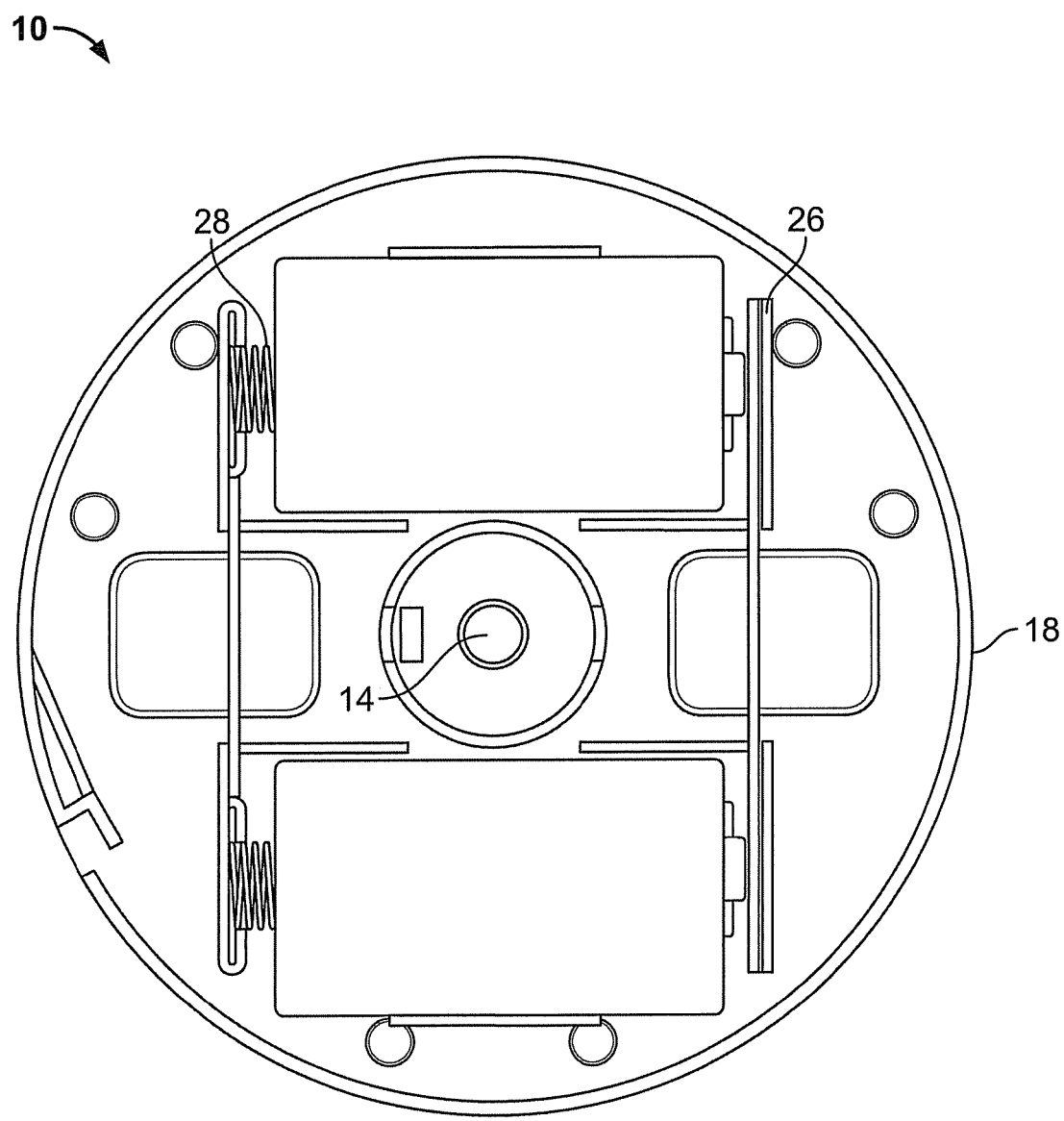
Figure 7:
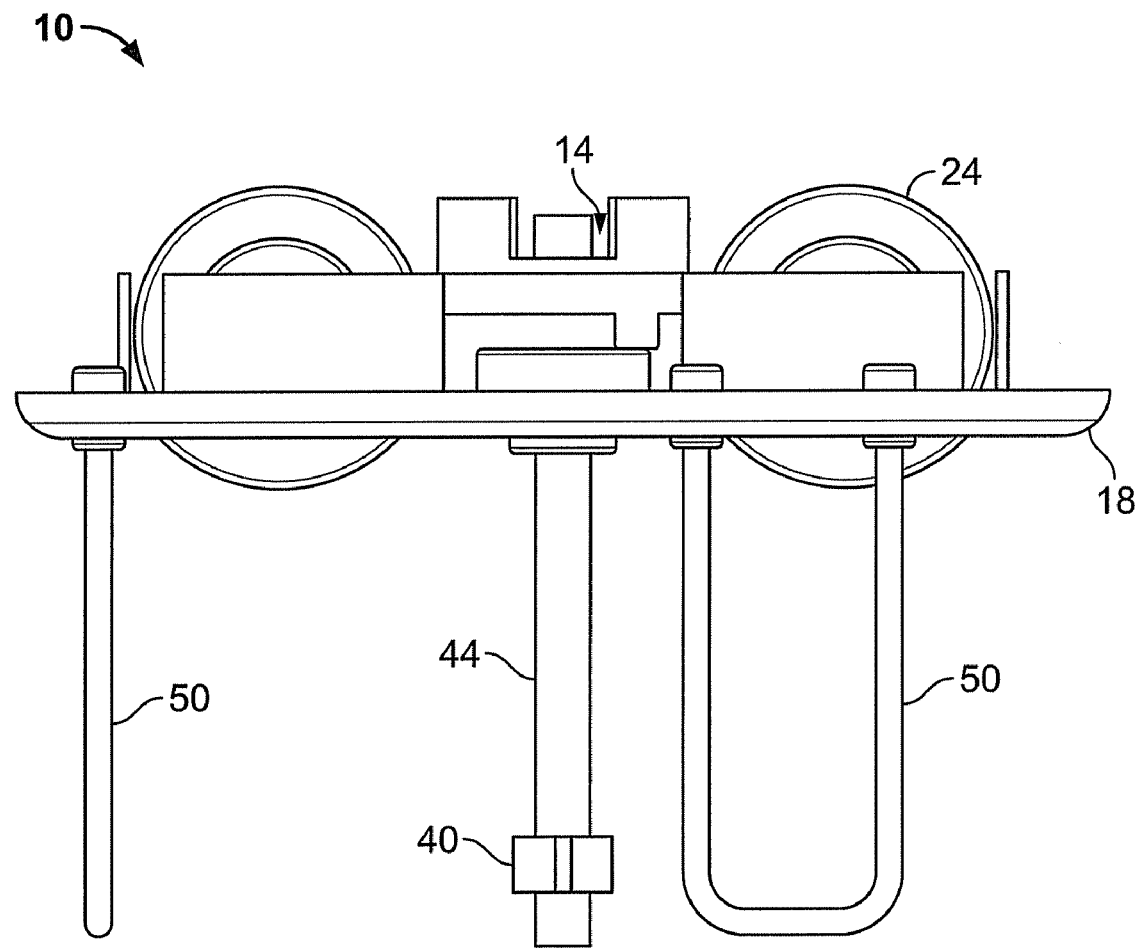
FIGS. 7 and 8 illustrates side elevation views of the water agitation system of FIG. 5A.
Figure 8:
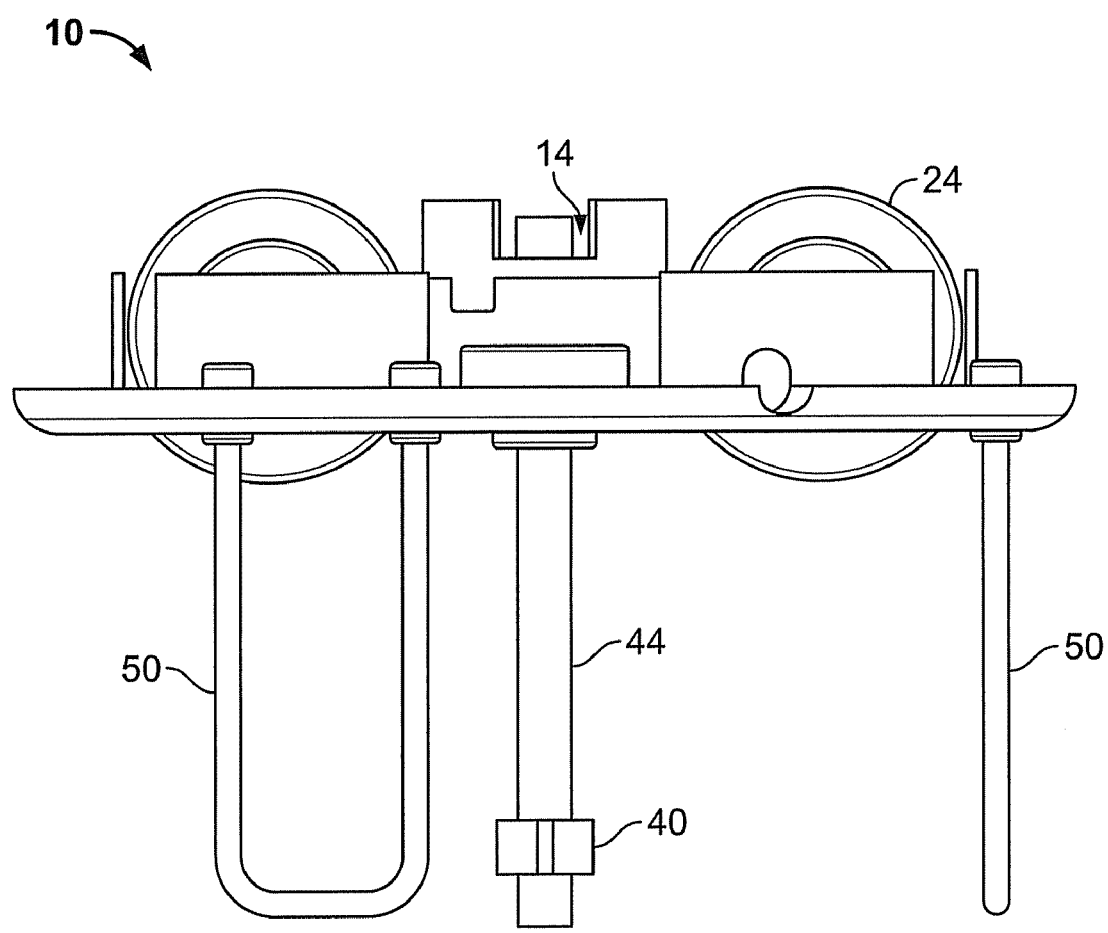
Figure 9:
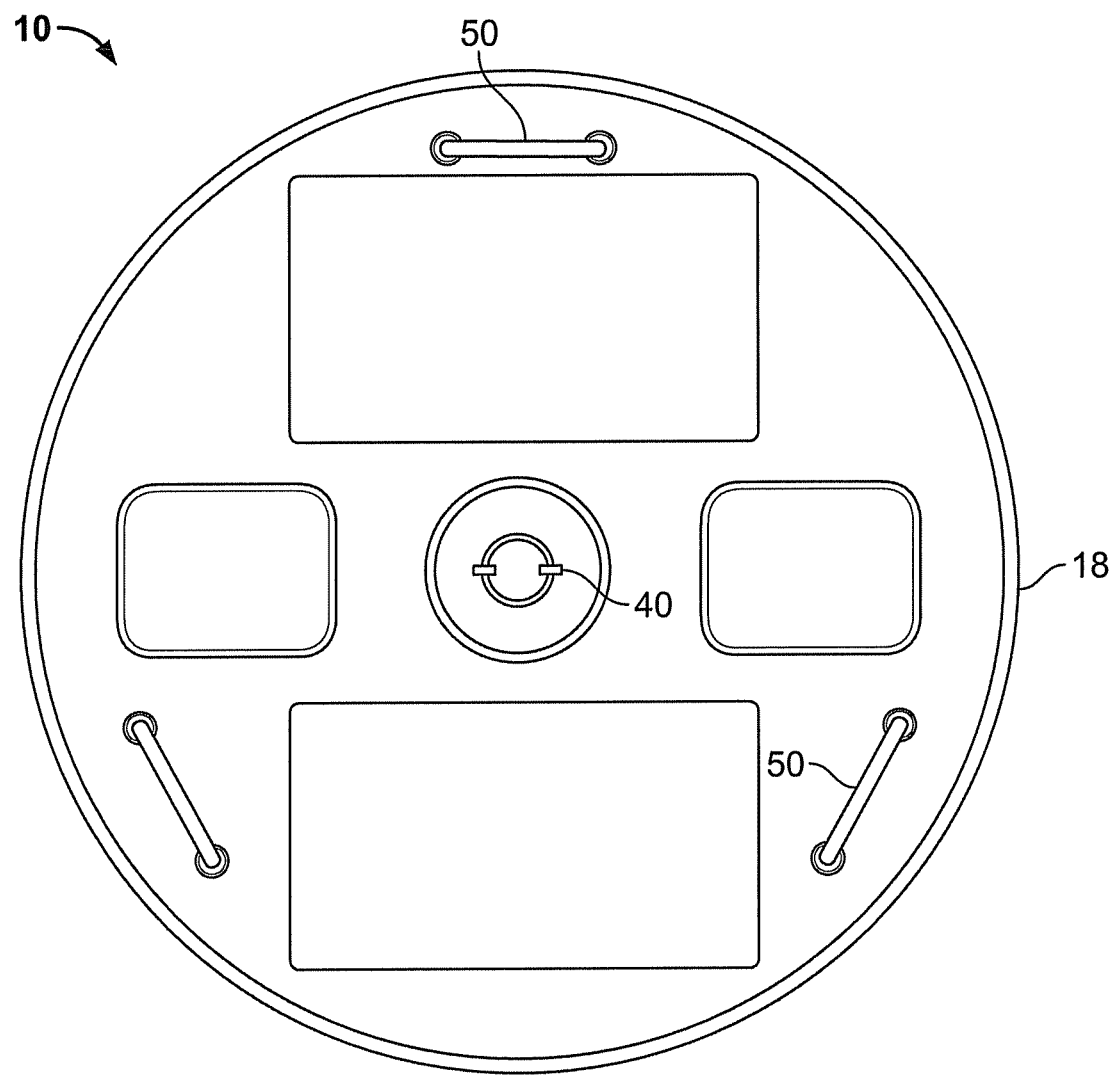
FIG. 9 illustrates a bottom plan view of the water agitation system of FIG. 2.

FIGS. 5A and 5B illustrate isometric views of the water agitation system 10 of FIG. 2, with the cover 20 of the housing 12 removed. The motor 14 is mounted within the inner compartment 22 to protect against moisture. The motor 14 may be battery operated such that batteries 24 (or battery) are also positioned within the inner compartment 22 to protect them from moisture. Positive and negative terminals 26, 28 interconnect the batteries 24 with the motor 14 for supplying power to the motor 14. The positive connection terminal 26 may be a conductive plate, whereas the negative terminal 28 may be a spring member. The upper surface 19 of the base 18 includes integrally formed features for supporting the motor 14, the batteries 24, and connection terminals 26, 28 within the housing 12. Specifically, the base 18 defines a motor compartment 30 for the motor 14, battery compartments 32 for the batteries 24, and mounting brackets 34 for the terminals 26, 28.

Optionally, the water agitation system 10 may be configured to receive power from an electrical outlet. That is, the water agitation system 10 may not use batteries, but instead may receive power from a standard electrical outlet or power source. Also, the water agitation system 10 may be operatively connected to a solar cell, such that the water agitation system 10 is operated through solar power.

Referring again to FIGS. 2 and 3, the base 18 and the cover 20 may be molded from a polymeric material such as plastic. The cover 20 may be dome shaped, but may also be shaped and sized in various other configurations without departing from the scope of the present invention. The cover 20 may be removably connected to the base 18 to provide access to the inner compartment 22 in order, for example, to replace the batteries 24. A variety of methods may be used for interconnecting the cover 20 and the base 18. For example, the cover 20 and base 18 may be interconnected by a threaded connection. Alternatively, the base 18 may snapably, latchably, or otherwise removably engage the cover 20. A seal member (not shown) may be interposed between the cover 20 and the base 18 for sealing against moisture infiltration into the housing 12. The seal member may be in the form of a compressible elastomeric seal, such as a rubber o-ring.

FIG. 3 illustrates a front elevation view of the water agitation system 10 of FIG. 2. The agitating mechanism 16 is driven by the motor 14 so as to impart motion to water contained within a water retention structure. In the illustrated embodiments, the agitating mechanism 16 includes a blade assembly 40 that is rotatably driven by the motor 14. The agitating mechanism 16 is configured to agitate water within a water retaining structure. That is, the blade assembly 40 is rotated in order to agitate, stir, circulate, or otherwise move surrounding water within a water retaining structure.

The blade assembly 40 is shown having two blades 42, but fewer or a greater number of blades may be provided. A drive shaft 44 interconnects the motor 14 to the blade assembly 40. The drive shaft 44 has a first end 45 connected to the motor 14 and a second end 47 connected to the blade assembly 40. The drive shaft 44 passes through the housing 12 in a sealed manner. The blades 42 extend outwardly from lateral surfaces 43 of the drive shaft 44 in directions defined by line A that is perpendicular to a longitudinal axis X of the drive shaft 44. In operation, the motor 14 rotates the drive shaft 44 in a direction shown by B. Because the blade assembly 40 is connected to the second end 47 of the drive shaft 44, the blades 42 of the blade assembly 40 move in the same direction. The movement of the blades 42 in the B direction within a water retention area of a water retention structure causes a corresponding movement, or circulation, of water within the water retention area. That is, the movement of the blades 42 imparts movement of water within the water retention area.

Optionally, the blades 42 may extend outwardly from the drive shaft in different directions. Also, the blades 42 may be placed at different positions along the length of the drive shaft 44.

As shown, for example, in FIG. 3, the drive shaft 44 passes through the base 18 of the housing 12. As such, the blade assembly 40 is located below the base 18 of the housing 12. A support structure 48 is provided for supporting the housing 12 above the water retention structure. In the illustrated embodiment, the support structure 48 includes a plurality of legs 50 that extend downwardly from the base 18. In the illustrated embodiment, the legs 50 are U-shaped. Each support leg 50 includes a pair of upstanding members 52 and a lower cross member 54 that interconnects the lower ends 51 of the upstanding members 52 and abuts the surface of the water retention structure. The upper ends 53 of the upstanding members 52 are connected to the base 18. The base 18 includes integral mounting brackets 58 that are configured to receive the upstanding members.

Alternatively, the drive shaft 44 may extend upwardly from the housing 12, in order to locate the blade assembly 40 above the housing 12. In such a design, the support structure 50 may be eliminated and the housing 12 may rest directly on the upper surface of the water retention structure.

Figure 4:
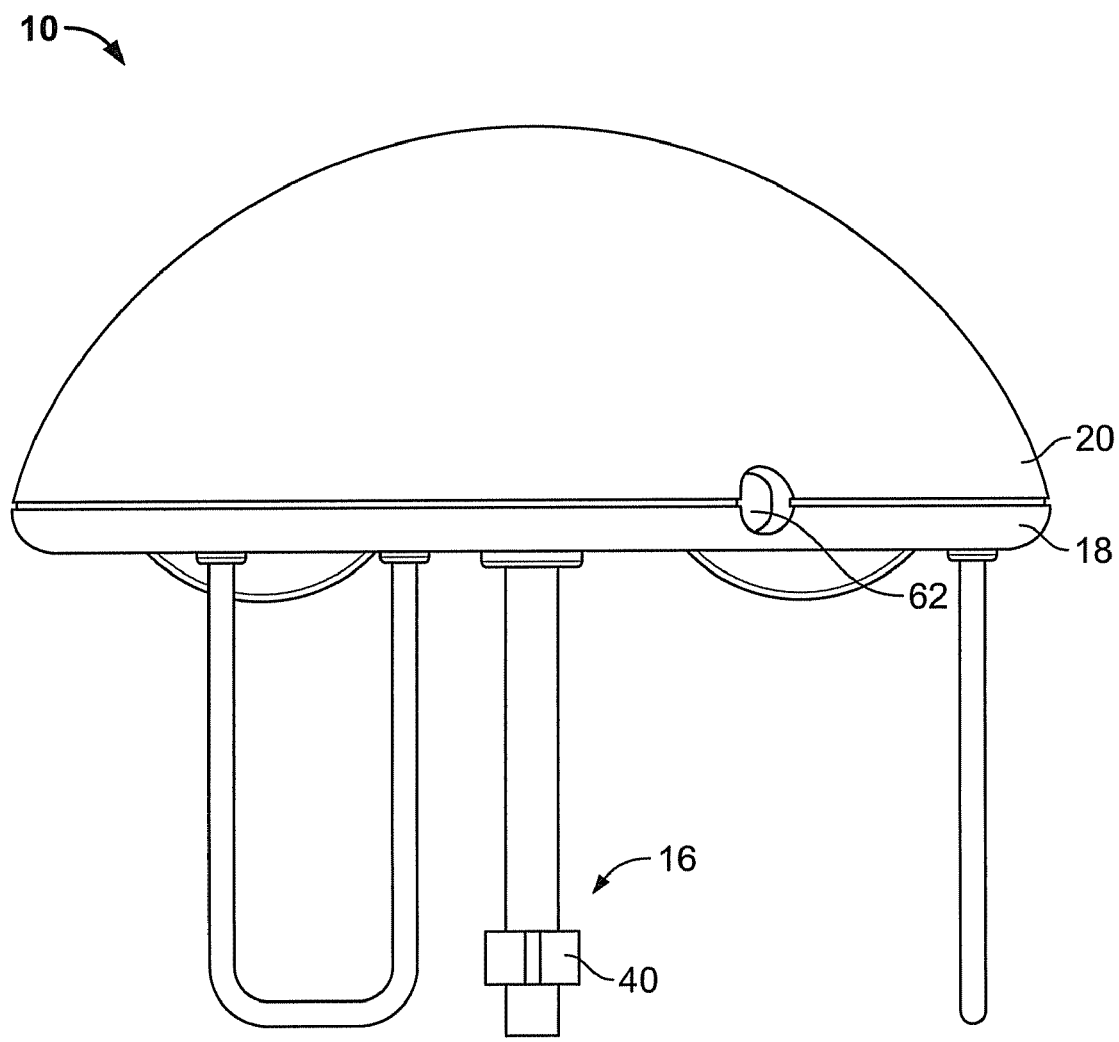
FIG. 4 illustrates a side elevation view of a water agitation system according to an embodiment of the present invention.

FIG. 4 illustrates a side elevation view of the water agitation system 10 of FIG. 2. The water agitation system 10 may include a switch or timer, such as a photocell sensor 62, for selectively delivering power to the motor 14. The photocell sensor 62 is interconnected with the motor for activating the motor 14 in the presence of light and deactivating the motor 14 in the absence of light. The photocell sensor 62 may be used to activate the motor 14 during the day and to deactivate the motor 14 at night to conserve battery power. Alternatively, a switch (not shown) may be provided to allow the user to manually activate/deactivate the motor 14. As another alternative, a timer (not shown) may be provided to allow the user to set the time(s) during which the motor 14 is active and inactive. When a photocell is provided, it may also be desirable to provide a bypass mechanism for bypassing the photocell. Such a bypass mechanism may take the form of a switch (not shown). Alternatively, a wire within the housing can be moved between terminals to bypass the photocell.

Figure 11:
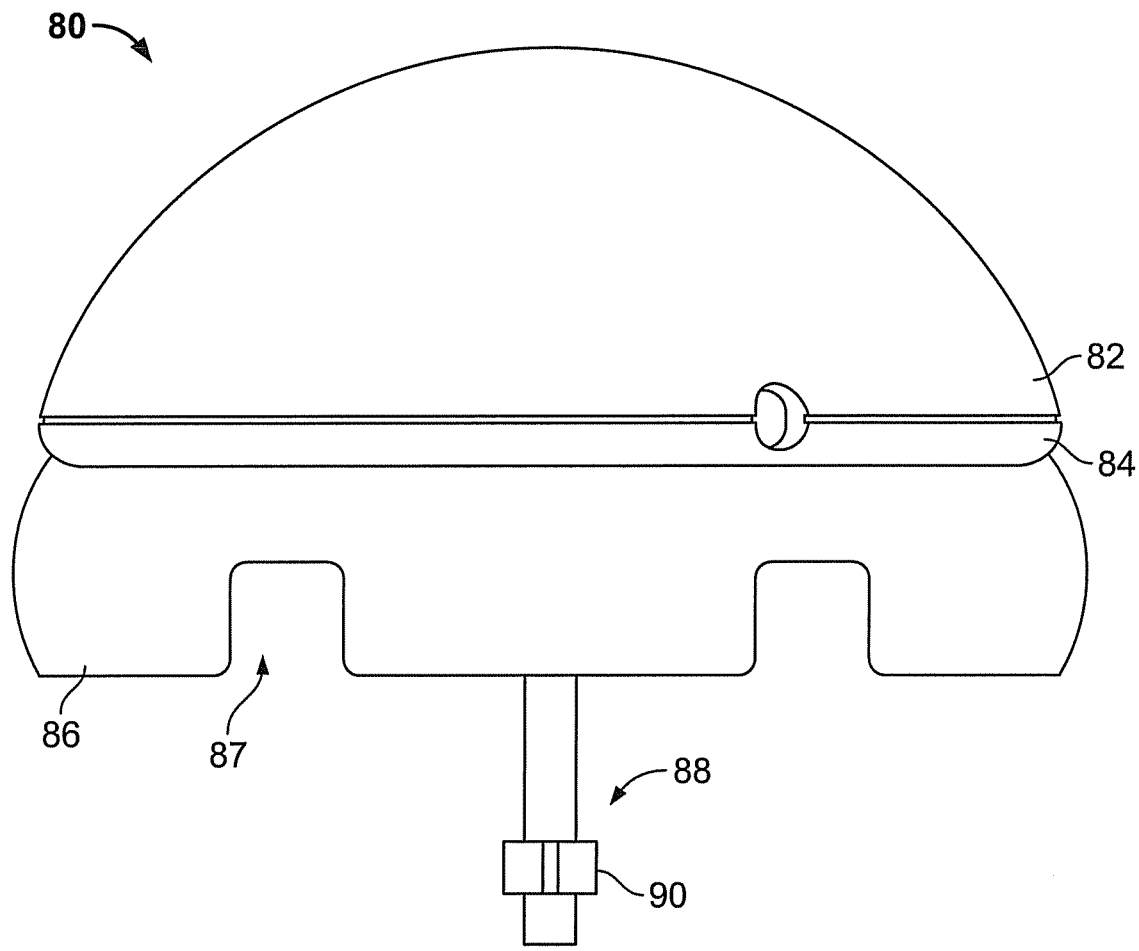
FIG. 11 illustrates a side elevation view of a water agitation system according to an alternative embodiment of the present invention.

FIG. 11 illustrates a side elevation view of a water agitation system 80 according to an alternative embodiment of the present invention. The water agitation system 80 includes a housing 82 that encloses a motor (as discussed above) and a base 84 integrally formed with a flotation member 86. Similar to the embodiments described above, an agitator 88 having a blade assembly 90 is operatively connected to the motor. The water agitation system 80 is similar to the water agitation system 10 except that the system 80 includes a flotation member 86, but does not include support structures, such as the support structures 48 shown, for example, in FIG. 3. The flotation member 86 has channels 87 formed therethrough. The flotation member 86 may be a ring of buoyant material, such as styrofoam, or an airtight tube filled with air. In particular, the flotation member may be a rubber tube or membrane that may be filled with air. In this case, the rubber membrane protects the motor and components within the housing 82 against water infiltration. Instead of a ring, the flotation member 86 may include a plurality of pontoons positioned underneath the housing 82. Preferably, the flotation member 86 provides enough buoyancy to ensure that the water agitation system 80 floats so that the agitator 88 does not abut against a surface of a water retention structure. Optionally, the flotation member 86 may be positioned within the housing 82, instead of extending downwardly from the base 84, as shown in FIG. 11.

Figure 12:
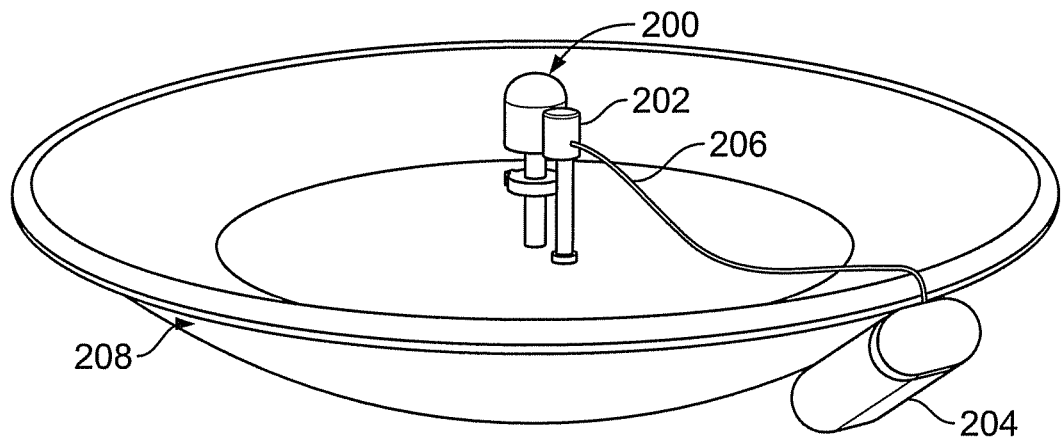
FIG. 12 illustrates an isometric view of a water agitation system according to another alternative embodiment of the present invention.

FIG. 12 illustrates an isometric view of a water agitation system 200 according to another alternative embodiment of the present invention. The water agitation system 200 includes a water agitation assembly 202 that is electrically connected to a remote power pack 204 through a water proof cable, or wire, 206. The water agitation assembly 202 is positioned within a water retention structure 208, such as a bird bath basin. The power pack 204 houses batteries, or may optionally provide an electrical connection between the water agitation assembly 202 and an electrical outlet. The water agitation assembly 202 houses a motor that operatively connects to a drive shaft having an agitation mechanism (as described above). Because the power pack 204 is located remotely from the water agitation assembly 202, less space within the water retention structure is occupied by the water agitation assembly 202.

Figure 13:
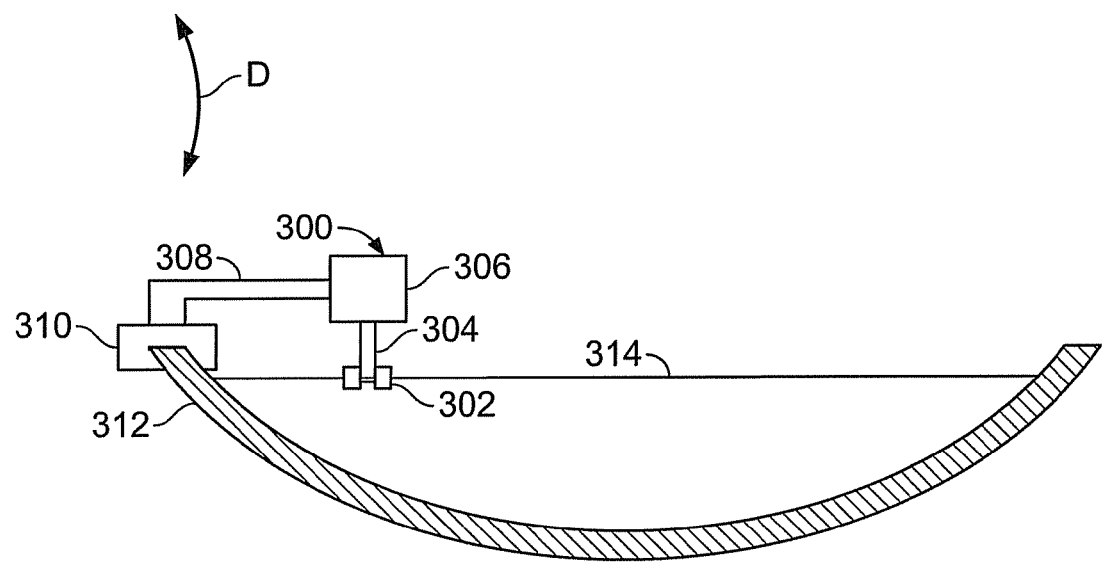
FIG. 13 illustrates a lateral view of a water agitation system according to another alternative embodiment of the present invention.

FIG. 13 illustrates a lateral view of a water agitation system 300 according to another alternative embodiment of the present invention. The water agitation system 300 includes an agitator 302 integrally formed with a drive shaft 304, which is in turn operatively connected to a motor positioned within a housing 306. The housing 306 is connected to a beam 308 that connects to a mounting bracket 310 that is secured to a portion of a water retention structure 312. The housing 306 may or may not include a battery compartment as discussed above with respect to other embodiments. The water agitation system 300 is configured so that the agitator 302 is positioned within water 314 retained by the water retention structure 312. The agitator 302 may be configured to float on the water 314 (e.g., the agitator 302 may be formed of a buoyant material such as Styrofoam or the like) or to be submerged within the water 314.

The beam 308 may flex in the directions of D depending on the water level within the water retention structure 312. That is, if the agitator 302 floats on the water 314, the agitator 302 rises and falls depending on the water level. The movement of the agitator 302 causes the housing 306 to move in response thereto, which in turn causes the beam 308 to flex accordingly.

Figure 14:
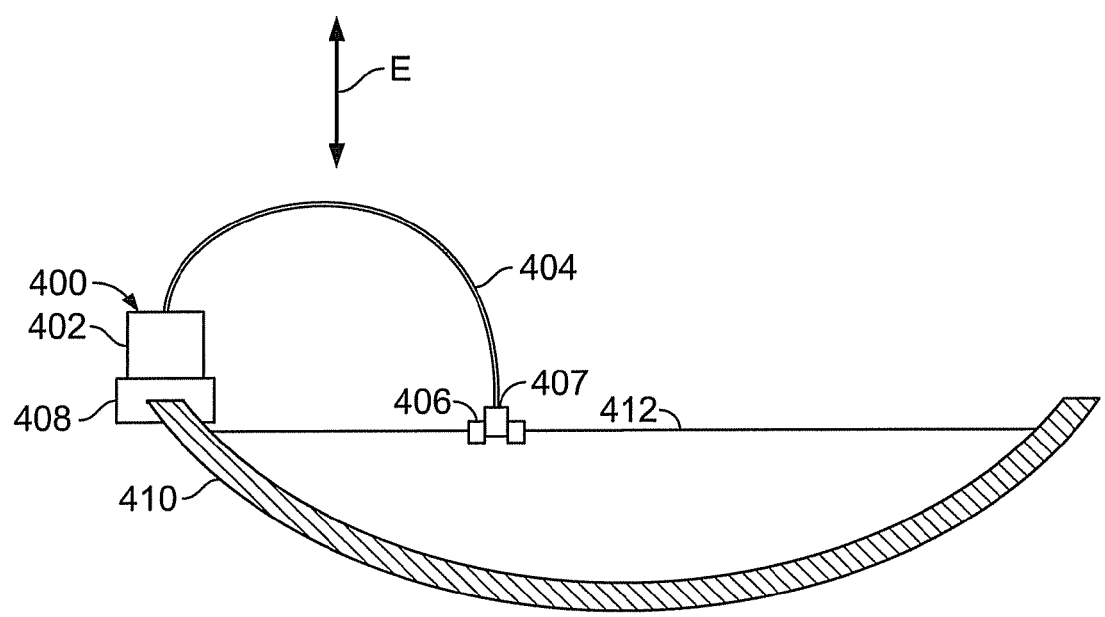
FIG. 14 illustrates a lateral view of a water agitation system according to another alternative embodiment of the present invention.

FIG. 14 illustrates a lateral view of a water agitation system 400 according to another alternative embodiment of the present invention. The system 400 includes a housing 402 having a motor that is operatively connected to a flexible wire 404. An agitator 406 is connected to a distal end 407 of the flexible wire 404. The housing 402 is supported by a bracket 408, which is secured to a portion of a water retention structure 410. The system 400 may include a battery compartment or it may be electrically connected to a standard electrical outlet.

The agitator 406 may be formed of a buoyant material and float on the surface of the water 412. The flexible wire 404 may be rigid enough to retain a general curved shape as shown in FIG. 14. Similar to the system 300, the level of the water 412 may cause the wire 404 to move in response thereto in the directions of E. The motor operates to rotate the wire 404, which is securely attached to the agitator 406. Thus, the agitator rotates in response to the rotation of the wire 404.

Figure 15:
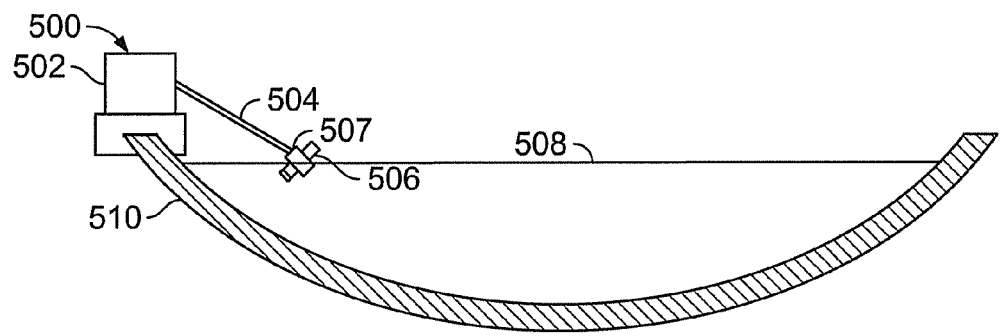
FIG. 15 illustrates a lateral view of a water agitation system according to another alternative embodiment of the present invention.

FIG. 15 illustrates a lateral view of a water agitation system 500 according to another alternative embodiment of the present invention. The system 500 includes a housing 502 having a motor that is operatively connected to an angled drive shaft 504. The angled drive shaft 504 is angled such that an agitator 506 that is secured to a distal end 507 of the drive shaft 504 is positioned within water 508 retained within a water retention structure 510. The housing 502 is supported by a bracket 512, which is secured to a portion of the water retention structure 510. The system 500 may include a battery compartment or it may be electrically connected to a standard electrical outlet.

Figure 16:
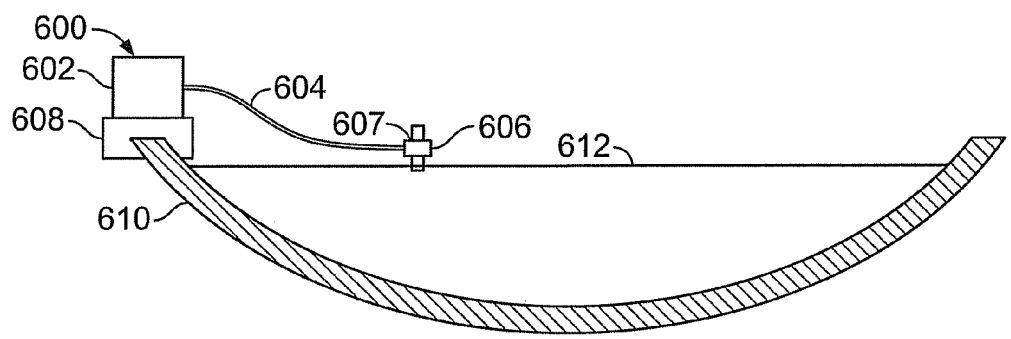
FIG. 16 illustrates a lateral view of a water agitation system according to another alternative embodiment of the present invention.

FIG. 16 illustrates a lateral view of a water agitation system 600 according to another alternative embodiment of the present invention. The system 600 includes a housing 602 having a motor that is operatively connected to a flexible wire 604. An agitator 606 is connected to a distal end 607 of the flexible wire 604. The housing 602 is supported by a bracket 608, which is secured to a portion of a water retention structure 610. The system 600 may include a battery compartment or it may be electrically connected to a standard electrical outlet.

The agitator 606 may be formed of a buoyant material and float on the surface of water 612 retained by the water retention structure 610. The flexible wire 604 may be float on the surface of the water 612 or submerge into the water 512. The motor operates to rotate the wire 604, which is securely attached to the agitator 606. Thus, the agitator rotates in response to the rotation of the wire 604.

Figure 17:
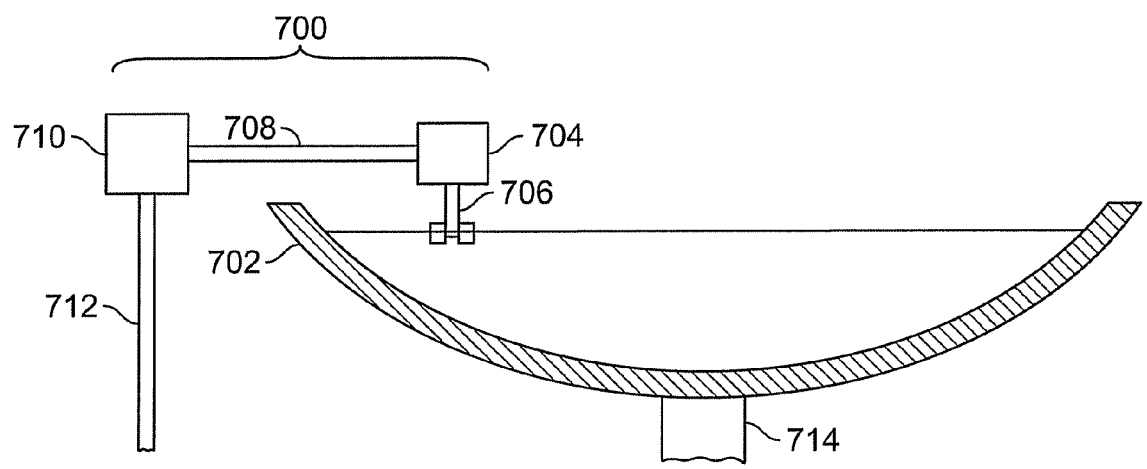
FIG. 17 illustrates a lateral view of a water agitation system according to another alternative embodiment of the present invention.

FIG. 17 illustrates a lateral view of a water agitation system 700 according to another alternative embodiment of the present invention. The water agitation system 700 is similar to the water agitation system 300 shown in FIG. 13 except that the water agitation system 700 is not mounted to a portion of the water retention structure 702. Instead, the housing 704 having a motor operatively connected to a drive shaft 706 is connected to a beam 708. The beam 708 is, in turn connected to a mounting member 710, which is supported by an upright member 712. The upright member 712 is separate and distinct from the water retention structure 702. The upright member 712 may be connected to a portion of a pedestal 714 supporting the water retention structure 702. Optionally, the upright member 712 may not be connected to the pedestal 714, and instead may be mounted directly into the ground. The upright member 712 may be a decorative pole or a statue capable of supporting the water agitation system 700. Alternatively, the water agitation systems 400, 500, and 600 may all be mounted to an upright member, such as upright member 712, instead of mounting to a portion of the water retention structure.

Thus, embodiments of the present invention provide an apparatus for imparting motion to water retained within water retaining structures, such as a bird bath. As discussed above, embodiments of the present invention may be used with various types of water retention structures, such as swimming pools, bird baths, ponds, and the like, in which water may stagnate. Embodiments of the present invention may be sized and shaped according to the size and shape of the water retention structure in which the water agitation system is used. The water agitation system may be battery powered, solar powered, or powered through a standard electrical outlet.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

The invention claimed is:

1. A water agitation system configured to be positioned within a water retention structure configured to receive and retain water, said system comprising:
a main body positionable within a water retention area of the water retention structure, said main body comprising a base removably interconnected to a cover, and an inner compartment defined between said base and cover; and
an agitator operatively connected to a motor housed within said main body, said agitator connected to a distal end of a drive shaft that extends outwardly from said main body, said agitator comprising at least one agitation member outwardly extending from a lateral surface of said distal end of said drive shaft, said motor configured to rotate said agitator in order to stir water retained within the water retention structure, wherein said at least one agitation member is operable to stir the water within the water retention structure,
said motor being positioned within said inner compartment.

2. The water agitation system of claim 1, wherein said water retention structure is a basin of a bird bath.

3. The water agitation system of claim 1, wherein said water retention structure is a livestock water trough.

4. The water agitation system of claim 1, wherein said water retention structure is one of a swimming pool, water tower, and pond.

5. The water agitation system of claim 1, said cover is dome shaped.

6. The water agitation system of claim 5, further comprising a seal member interposed between said cover and said base.

7. The water agitation system of claim 1, further comprising a support member configured to support said main body above a bottom surface of the water retention structure.

8. The water agitation system of claim 7, wherein the support member comprises a plurality of legs that extend downwardly from said main body.

9. The water agitation system of claim 1, wherein said motor is battery powered.

10. The water agitation system of claim 1, wherein said motor is electrically connected to a standard electrical outlet.

11. The water agitation system of claim 1, further comprising at least one of a timer and sensor for selectively activating and deactivating said motor.

12. The water agitation system of claim 1, wherein said at least one agitation member comprises at least one blade outwardly extending from a lateral surface of said drive shaft that is rotatably driven by said motor.

13. A water agitation system for use with a water retention structure comprising:
a motor operatively connected to a proximal end of a drive shaft;
a base supporting said motor;
a cover positioned over said motor, said cover being removably interconnected to said base, and an inner compartment defined between a perimeter of said base and said cover, said motor being positioned within said inner compartment; and
a blade assembly extending outwardly from said drive shaft, said motor operable to rotate said blade assembly in order to stir water retained within the water retention structure.

14. The water agitation system of claim 13, wherein said water retention structure is a basin of a bird bath.

15. The water agitation system of claim 13, wherein said water retention structure is a livestock water trough.

16. The water agitation system of claim 13, wherein said water retention structure is one of a swimming pool, water tower, and pond.

17. The water agitation system of claim 13, wherein said cover is dome shaped.

18. The water agitation system of claim 17, further comprising a seal member interposed between said cover and said base.

19. The water agitation system of claim 13, further comprising a support member configured to support said water agitator above a bottom surface of the water retention structure.

20. The water agitation system of claim 19, wherein the support member comprises a plurality of legs that abut said bottom structure of the water retention area.

21. The water agitation system of claim 13, wherein said motor is battery powered.

22. The water agitation system of claim 13, wherein said motor is electrically connected to a standard electrical outlet.

23. The water agitation system of claim 13, further comprising at least one of a timer and sensor for selectively activating and deactivating said motor.

24. The water agitation system of claim 13, further comprising at least one blade extending from a lateral surface of said drive shaft that is rotatably driven by said motor.

25. A water agitation system adapted to be positioned within a water retention structure configured to receive and retain water, said system comprising:
a main body positioned within a water retention area of the water retention structure, said main body having a base removably secured to a cover, and an inner compartment defined between said base and cover,
support members supporting said main body above a bottom surface of the water retention structure; said support members comprising a plurality of legs that extend downwardly from said main body;

an agitator operatively connected to a motor positioned within said inner compartment of said main body, said agitator connected to a distal end of a drive shaft that extends outwardly from said main body, said agitator having at least one blade outwardly extending from a lateral surface of said drive shaft that is rotatably driven by said motor in order to stir water retained within the water retention structure.

26. The water agitation system of claim 25, wherein said water retention structure is a basin of a bird bath.

27. The water agitation system of claim 25, wherein said water retention structure is a livestock water trough.

28. The water agitation system of claim 25, wherein said water retention structure is one of a swimming pool, water tower, and pond.

29. The water agitation system of claim 25, further comprising a seal member interposed between said cover and said base.

30. The water agitation system of claim 25, wherein said motor is battery powered.

31. The water agitation system of claim 25, wherein said motor is electrically connected to a standard electrical outlet.

32. The water agitation system of claim 25, further comprising at least one of a switch, timer and sensor for selectively activating and deactivating said motor.

* * * * *